Patented June 1, 1937

2,081,994

UNITED STATES PATENT OFFICE 2,081,994

METHOD OF PLUCKING POULTRY

Nathaniel Hew Grace, Ottawa, Ontario, Canada

No Drawing. Application November 18, 1935, Serial No. 50,368. In Canada February 12, 1935

2 Claims. (Cl. 17—45)

This invention relates to the dressing and, more particularly, the plucking of poultry.

In this art substantial difficulties are experienced in removing all the feathers, pin-feathers, hair and scales without marring the appearance of the bird. For commercial and aesthetic reasons, as well as for the convenience of the consumer, it is important to retain the natural skin appearance of the bird with all pins, hair, scales and the like removed.

Various methods have been in commercial use, including rough plucking by hand followed by application to the carcass of melted waxy and adhesive material, which is allowed to solidify, and is then removed, with a view to taking with it the remaining feathers, pins, hair, etc. Frequently the carcass is subjected to a soft scald step, which comprises applying thereto, by immersion or otherwise, hot water with a view to loosening the feathers and pins. This requires maintenance of water supply at carefully controlled temperature and equipment for the drying of the carcass before application of the waxy material. This is practicable only in large scale operations and even there it adds considerably to the cost of operation. Although the use of the so-called "soft scald" makes the removal of the pins and the like somewhat easier, it generally appears to have an adverse effect on the appearance of the finished bird, in which the natural "bloom" is desirable. The tendency to break or tear the skin of the bird is quite prevalent in the usual methods and, of course, this is objectionable. In practice heretofore, when a wax plucking step has been employed, it has been found necessary to use the soft scald as a preliminary step.

The object of the present invention is to provide an improved, convenient and inexpensive method for dressing poultry and the like, and particularly for depilating the carcass after the rough feathers have been removed. A further object is to provide a method which may be employed, without special skill or expensive equipment, by relatively small operators, such as poultrymen or farmers, as well as by the large scale operators, such as packers. A still further object is to provide specific depilatory materials particularly adapted for use in a dry pluck method.

The method of the present invention will now be described in detail.

The bird is killed by sticking and is dry rough plucked to remove coarse feathers in the usual way and the body is allowed to cool, during a period which will vary considerably with prevailing temperature conditions of the operating room, until it reaches a critical temperature at which it is best adapted to receive the fluid depilatory material; that is, so that the depilatory material will not unduly adhere to or smear the skin of the bird but will best grip the pins, hair and the like to be removed. This temperature is important and should be at least as low as 90° F. In practice the operative temperature range, measured as skin temperature, is 90–70° F., and a skin temperature of 80° F. is best suited for large scale operations. There is now applied to the so-cooled carcass a depilatory material in a fluid condition at temperatures of 115–140° F. and preferably 127–136° F. This may be readily accomplished by dipping the carcass in the fluid material. Two quick dips with a brief interval of time between provide a satisfactory coating. Of course, the coating may be applied by spraying or otherwise, as desired. The coating is allowed to cool, for say 20 to 45 minutes, depending upon prevailing temperature conditions, until it is strong and coherent with elastic properties, but not to the point where brittleness develops. The coating is then stripped off and takes with it the undesirable feathers, hair and the like.

The control of the initial cooling of the bird following rough plucking and the temperature of the applied coating material are important in securing complete removal of the pins, hair and the like, and at the same time in avoiding deterioration in the skin appearance of the bird, which is a primary consideration.

The depilatory materials found to be particularly suitable for best results in the present method contain paraffin wax and rosin and preferably a fat, such as lard, in defined proportions, and may contain gum damar, candelilla wax and rubber. Preferred materials may be given as follows:

(1) Paraffin, 60%; rosin, 30%; gum damar, 8%; and lard, 2%. The proportion of gum damar may be reduced and that of the rosin increased.

(2) Paraffin, 46.7%; candelilla wax, 7.30%; rosin, 39.30%; rubber, 3.77%; and lard, 2.93%.

(3) Paraffin, 60%; rosin, 38%; and lard, 2%.

(4) Paraffin, 60%; rosin, 30%; candelilla wax, 8%; and lard, 2%. Other equivalent waxes, resins and oils or fats may be employed in the mixtures, but the particular mixtures given have been found to give best results.

The actual cost involved in dry wax-plucking is light, since practically all the wax or depilatory mixture may be recovered by heating the removed coating material and straining off the feathers and other undesired constituents. A press may be employed for a further recovery of the coating material. For example, not more than one pound of the depilatory mixture need be lost in the treatment of as many as fifty birds.

While the dry method, as described, is preferred in most cases, it has been found that there are certain advantages in a soft-scalding step with young and very pinny birds which have very short pin feathers. Most of the quill is under the skin and the short end is more or less completely covered with a scaly coating—probably loose epidermal tissue—which prevents the waxy coating from getting a firm grip on the quill. The result is that the feather may be pulled out, leaving the hollow quill in the skin. In such cases soft-scalding at a temperature of 129° F. removes or changes the superficial or scaly layer, permitting the coating to grip and adhere to the pins.

The particular merits of the present method appear to be attributable to features not heretofore recognized as being of any importance; those are, in particular, the preliminary cooling of the carcass, the temperature of the fluid depilatory material, and the particular composition of these materials.

I claim:

1. A method of dressing poultry comprising cooling the rough plucked warm carcass to a skin temperature between 90° and 70° F., at which a waxy composition containing rosin will grip and adhere to hair, pins and the like but not smear the skin of the carcass, coating the so-cooled carcass with a congealable composition containing paraffin, rosin in the proportion of 30 to 40 per cent and one of a group including fat and gum damar, cooling the carcass to congeal the adhering composition and removing the composition with hair, pins and the like.

2. The method of dressing poultry as defined in claim 1 in which the waxy composition as applied to poultry carcasses, is maintained at a temperature of between 115° F. and 140° F.

NATHANIEL HEW GRACE.